United States Patent
Park

(10) Patent No.: US 10,718,964 B2
(45) Date of Patent: Jul. 21, 2020

(54) ARRAY SUBSTRATE FOR DISPLAY DEVICE

(71) Applicant: LG Display Co., Ltd., Seoul (KR)

(72) Inventor: Jung-Soo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 361 days.

(21) Appl. No.: 14/106,252

(22) Filed: Dec. 13, 2013

(65) Prior Publication Data

US 2014/0184989 A1   Jul. 3, 2014

(30) Foreign Application Priority Data

Dec. 27, 2012  (KR) .................. 10-2012-0154240

(51) Int. Cl.
| | |
|---|---|
| *G02F 1/1345* | (2006.01) |
| *G02F 1/133* | (2006.01) |
| *G02F 1/1362* | (2006.01) |
| *G02F 1/1337* | (2006.01) |

(52) U.S. Cl.
CPC ...... *G02F 1/13306* (2013.01); *G02F 1/13452* (2013.01); *G02F 1/136204* (2013.01); *G02F 1/13454* (2013.01); *G02F 1/133784* (2013.01)

(58) Field of Classification Search
None
See application file for complete search history.

(56) References Cited

U.S. PATENT DOCUMENTS

| | | | |
|---|---|---|---|
| 5,742,074 A | 4/1998 | Takizawa et al. | |
| 5,949,502 A * | 9/1999 | Matsunaga | G02F 1/136204 349/40 |
| 6,043,971 A * | 3/2000 | Song | G02F 1/136204 349/40 |
| 2003/0214500 A1* | 11/2003 | Ishii | G02F 1/134363 345/211 |

(Continued)

FOREIGN PATENT DOCUMENTS

| | | |
|---|---|---|
| CN | 1753060 A | 3/2006 |
| CN | 101158762 A | 4/2008 |

(Continued)

OTHER PUBLICATIONS

State Intellectual Property Office of the People's Republic of China, First Office Action, Chinese Patent Application No. 201310674760.6, dated Dec. 25, 2015, sixteen pages.

(Continued)

*Primary Examiner* — Jessica M Merlin
*Assistant Examiner* — Mark D Teets
(74) *Attorney, Agent, or Firm* — Fenwick & West LLP

(57) ABSTRACT

An array substrate for a display device includes a substrate including a display area displaying an image, and a non-display area surrounding the display area; a data driving IC mounted at the non-display area and outputting an image data voltage to the display area; a first pad corresponding to an input pin of the data driving IC and formed at the non-display area; a second pad corresponding to an output pin of the data driving IC and formed at the non-display (Continued)

area; a first conductive bar formed between the first pad and the second pad; and a second conductive bar extending from an end portion of the first conductive bar to a peripheral end portion of the non-display area.

19 Claims, 6 Drawing Sheets

(56) References Cited

U.S. PATENT DOCUMENTS

| | | | | |
|---|---|---|---|---|
| 2006/0244741 | A1* | 11/2006 | Kimura | G02F 1/13394 345/204 |
| 2007/0247582 | A1* | 10/2007 | Mochizuki | G02F 1/1345 349/149 |
| 2007/0268442 | A1 | 11/2007 | Oh et al. | |
| 2008/0079887 | A1* | 4/2008 | Liu | G02F 1/136286 349/149 |
| 2009/0294771 | A1* | 12/2009 | Kim | G02F 1/136204 257/59 |
| 2010/0026659 | A1* | 2/2010 | Long | B32B 17/10036 345/174 |
| 2010/0079692 | A1* | 4/2010 | Hwang | G02F 1/1339 349/40 |

FOREIGN PATENT DOCUMENTS

| | | |
|---|---|---|
| JP | H03 29925 A | 2/1991 |
| JP | H11-2820174 A | 10/1999 |
| JP | 2003-330033 A | 11/2003 |
| JP | 2004-233842 A | 8/2004 |
| JP | 2007-219203 | 8/2007 |
| TW | 561302 B | 11/2003 |
| TW | 200612143 A | 4/2006 |
| TW | 200818092 A | 4/2008 |

OTHER PUBLICATIONS

Taiwan Intellectual Property Office, First Office Action, Taiwanese Patent Application No. 102147277, dated Jul. 28, 2015, thirteen pages.

Japan Patent Office, Office Action, Japanese Patent Application No. 2013-261350, dated Aug. 19, 2014, five pages [with concise explanation of relevance in English.]

European Patent Office, Search Report and Opinion, European Patent Application No. 13197360.4, dated May 27, 2014, nine pages.

Communication pursuant to Article 94(3) EPC for European Patent Application No. EP 13197360.4, dated Apr. 5, 2018, 5 Pages.

\* cited by examiner

10

ARRAY SUBSTRATE FOR DISPLAY DEVICE

CROSS REFERENCE TO RELATED APPLICATIONS

The present invention claims the benefit of Korean Patent Application No. 10-2012-0154240, filed in Korea on Dec. 27, 2012, which is hereby incorporated by reference for all purposes as if fully set forth herein.

BACKGROUND OF THE INVENTION

Field of the Invention

The present invention relates to an array substrate for a display device, and more particularly, to an array substrate for a display device including a shorting bar to prevent defects due to static electricity and a method of manufacturing the same.

Discussion of the Prior Art

Generally, a liquid crystal display device is operated using optical anisotropy and polarization of liquid crystal. Molecules of the liquid crystal have a thin and long structure and have a directional alignment, and when applying electric field to the molecules, the alignment of the molecules can be controlled.

In other words, when the alignment direction of the liquid crystal molecules is changed using an electric field, light is refracted in the aligned direction due to the optical anisotropy and thus images can be displayed.

The liquid crystal display device is manufactured by a TFT process of forming a gate line, a data line, a thin film transistor (TFT) and a pixel electrode on an array substrate, and forming a black matrix, a color filter and a common electrode on a color filter substrate, a cell process of injecting a liquid crystal between the array substrate and the color filter substrate, cutting in cell unit, and forming a unit panel, and a module process of attaching a driving IC and a printed circuit board (PCB) to the unit panel, and assembling it with a backlight unit.

The plural array substrates can be in a large-sized substrate referred to as a mother glass or an array mother glass.

Static electricity may occur when manufacturing the mother glass and cause fatal adverse effects on elements formed at the array substrate.

For example, when an insulating layer between two conductive lines is electrically broken down by strong static electricity, the two conductive lines are short-circuited and thus the liquid crystal display device is not normally operated.

To prevent the short circuit and degradation of the elements due to the static electricity, a shorting bar is formed at a peripheral portion of the mother glass and at a non-display region of each cell, which is explained as follows.

FIG. 1 is a view illustrating the prior art mother glass, and FIG. 2 is a view enlarging a region A of FIG. 1.

Referring to FIGS. 1 and 2, a mother glass 10 includes a plurality of cell areas CA, each of which corresponds to an array substrate of a unit cell to be formed through post-processes.

Size of each of the plurality of cell areas CA may be changed depending on size of the liquid crystal display device. FIG. 1 shows an example that 32 cells are formed in one mother glass 10.

A shorting bar 20 is formed on the mother glass 10, and each shorting bar 20 includes a plurality of horizontal portions each formed at a boundary portion between adjacent row lines of cell areas CA, and an edge portion connecting the plurality of horizontal portions and surrounding a peripheral portion of the whole of the cell areas CA.

Each cell area CA includes a non-display area NDA and a display area DA, and the non-display area NDA includes a FPC (flexible printed circuit) pad portion 30 and a DIC (driving integrated circuit) pad portion 40.

The display portion DA may include a plurality of gate lines 70, a plurality of data lines 80 and electrical elements such as a plurality of thin film transistors.

A plurality of third pads 32 are formed in the FPC pad portion 30, and a plurality of first pads 42, and a plurality of second pads 44 are formed in the DIC pad portion 40.

The third pads 32 of the FPC pad portion 30 are portions to which a flexible printed circuit (FPC) board is attached in a later module process, and are electrically connected to the shorting bar 20 through a plurality of third link lines 25.

The first pads 42 and the second pads 44 of the DIC pad portion 40 are portions to which a data driving integrated circuit (IC) is attached in a later module process, and particularly, the data driving IC may be mounted in a COG (chip on glass) manner the data driving IC is directly connected to the array substrate. The first pads 42 are connected to the third pads 32 through first link lines 35.

The data driving IC functions to supply image data voltages to the display area (DA) according to a timing signal and image data signal from the outside, and in some cases, the data driving IC may generate a timing signal therein other than the timing signal from the outside and generate or supply a gate driving signal.

The second pads 44 are connected to the display area DA through a plurality of second link lines 45, and may function to transfer the image data voltage from the data driving IC to the display area DA.

The shorting bar 20 is formed to have a width much greater than other signal lines. Accordingly, the shorting bar 20 may function as a reservoir of charges, and charges generated by static electricity in the array substrate in processes of manufacturing the array substrate is transferred to the shorting bar 20 and discharged to an external apparatus stage or the like.

However, even though the shorting bar 20 is configured, internal circuit is prone to be damaged because of static electricity occurring in the cell process.

Particularly, when coating an alignment layer on the array substrate and conducting a rubbing process, static electricity is prone to occur because of direct friction between a rubbing cloth and signal line/pad portion on the non-display area NDA where the alignment layer is not coated. Accordingly, damage to circuit portion occurs because of movement of charge inside the display area DA.

Particularly, in case of the COG type driving IC, the DIC pad portion 40 is separately configured and thus moving path of current is complicated. Accordingly, the prior art shorting bar 20 is insufficiently to completely restrain defect occurrence due to static electricity.

SUMMARY OF THE INVENTION

Accordingly, the present invention is directed to an array substrate for a display device which substantially obviates one or more of the problems due to limitations and disadvantages of the prior art.

An advantage of the present invention is to provide an array substrate for a display device that can defect due to static electricity occurring in a TFT process and a cell process.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, an array substrate for a display device includes a substrate including a display area displaying an image, and a non-display area surrounding the display area; a first pad corresponding to an input pin of a data driving IC and formed at the non-display area; a second pad corresponding to an output pin of the data driving IC and formed at the non-display area; a first conductive bar formed between the first pad and the second pad; and a second conductive bar extending from the first conductive bar to a peripheral end portion of the non-display area.

In another aspect, an array substrate for a display device includes a substrate including a display area displaying an image, and a non-display area surrounding the display area; an on/off pad formed at the non-display area for application of an on/off voltage from outside the array substrate; and a conductive bar formed adjacent to the on/off pad and extending to a peripheral end portion of the non-display area.

In another embodiment, a method of manufacturing an array substrate is disclosed. The method comprises forming a first pad corresponding to an input pin of a data driving integrated circuit (IC), the first pad formed in a non-display area of a substrate that surrounds a display area of the substrate. A second pad corresponding to an output pin of the data driving IC is formed in the non-display area. A first conductive bar located between the first pad and the second pad and a second conductive bar extending from the first conductive bar to a peripheral end portion of the non-display area are formed. A rubbing process is performed on the array substrate, the rubbing process generating static electricity that is dischargeable through the first conductive bar and the second conductive bar.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
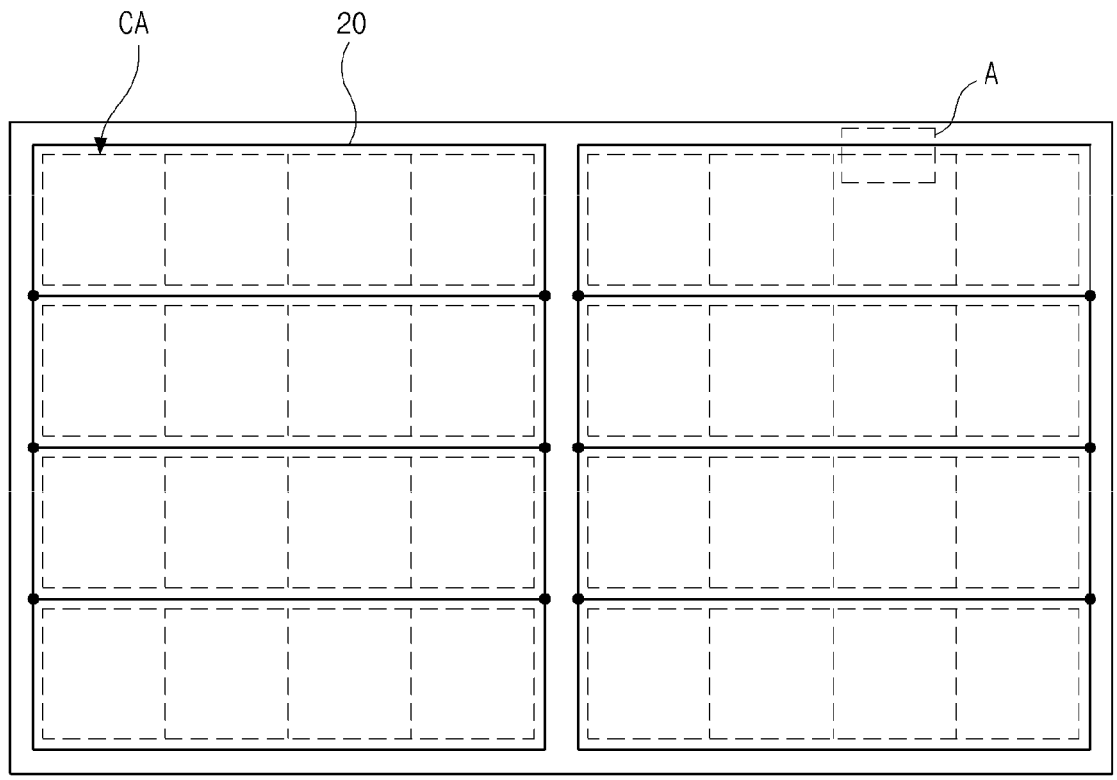
FIG. 1 is a view illustrating the prior art mother glass.
Figure 2:
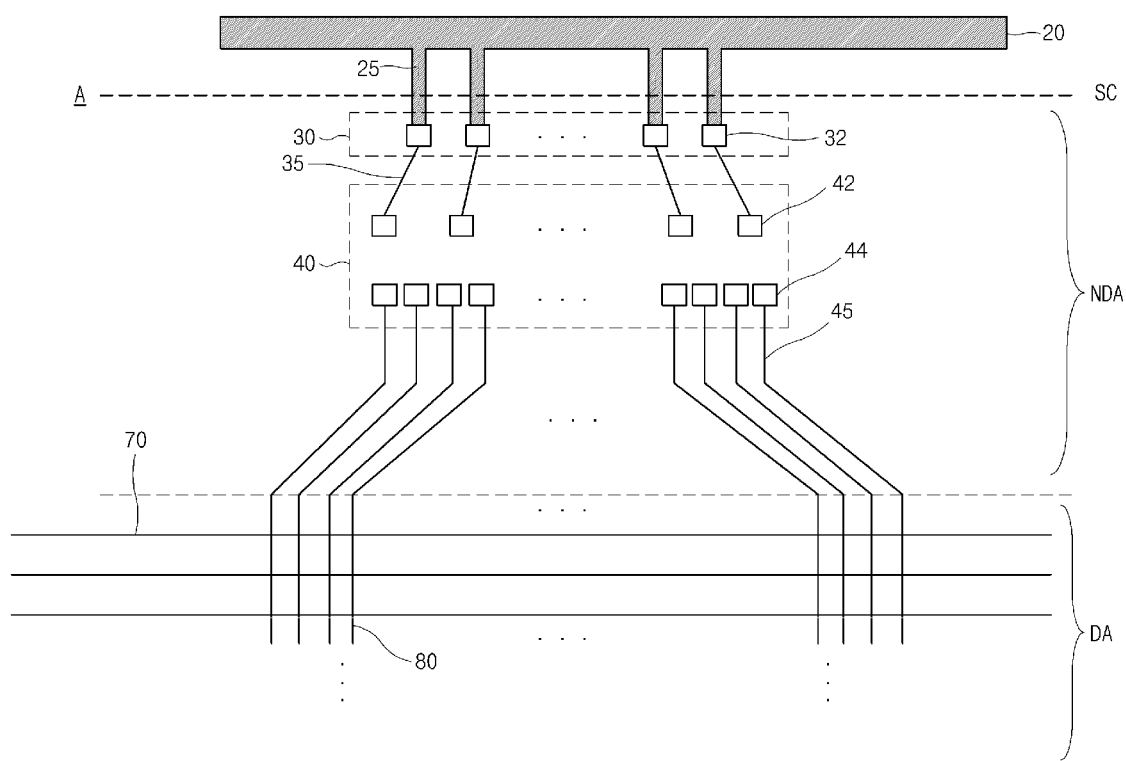
FIG. 2 is a view enlarging a region A of FIG. 1.
Figure 3:
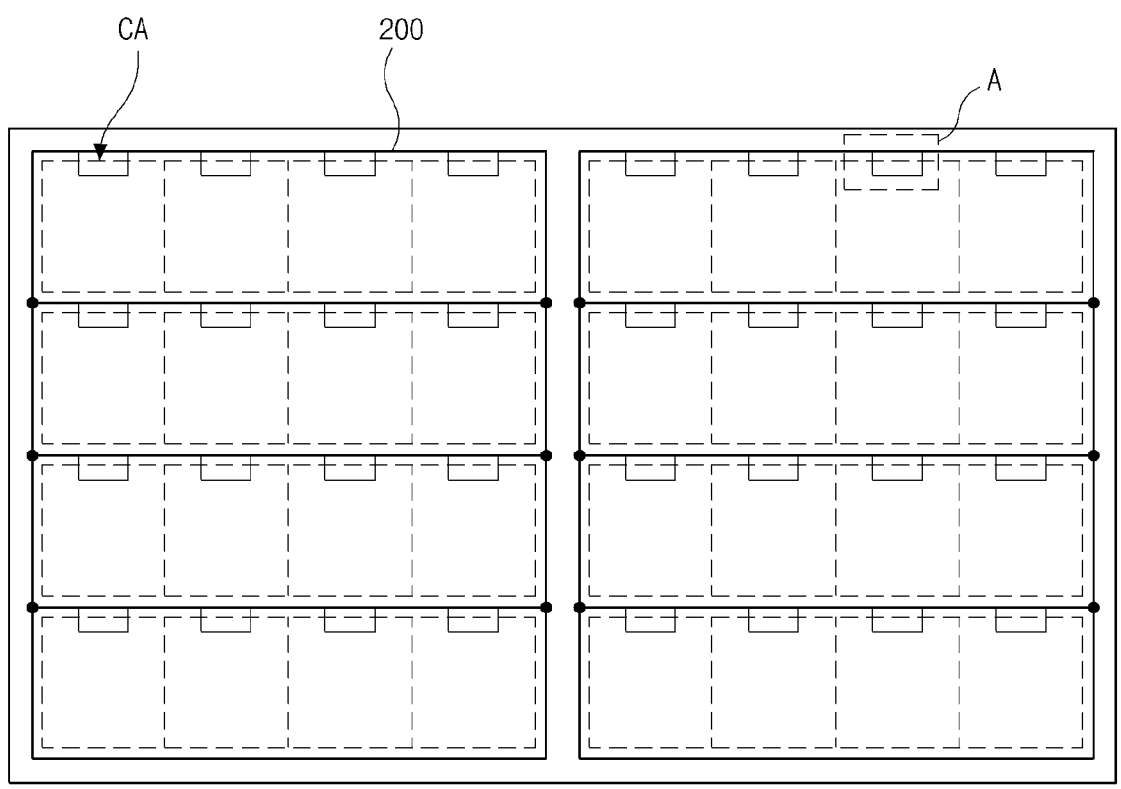
FIG. 3 is a view illustrating a mother glass including an array substrate for a display device according to an embodiment of the present invention.
Figure 4:
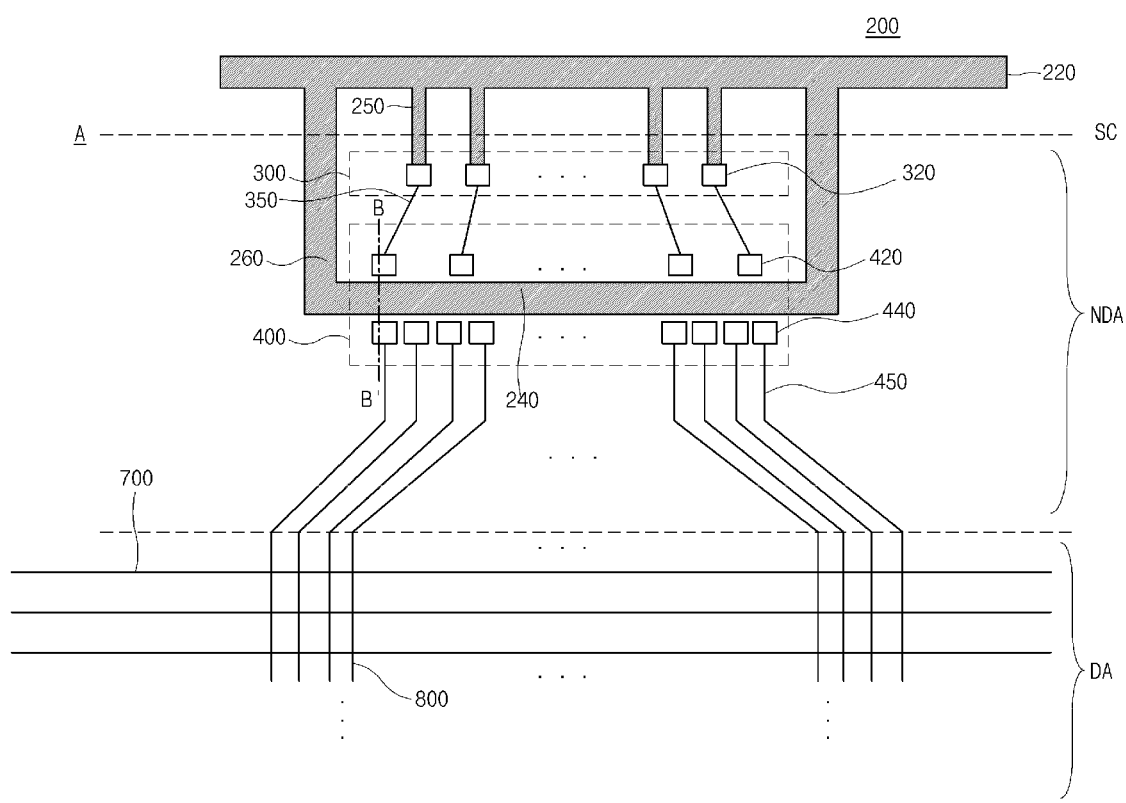
FIG. 4 is a view enlarging a region A of FIG. 3.

FIG. 3 is a view illustrating a mother glass including an array substrate for a display device according to an embodiment of the present invention, and FIG. 4 is a view enlarging a region A of FIG. 3.

Referring to FIGS. 3 and 4, a mother glass 100 includes a plurality of cell area CA, each of which correspond to an array substrate for a unit panel finished in a later process.

A shorting bar 200 is formed between horizontal portions and at a peripheral portion of the mother glass 100.

The array substrate includes a non-display area NDA and a display area DA, and the non-display area NDA includes a FPC (flexible printed circuit) pad portion 300 and a DIC (driving integrated circuit) pad portion 400.

The display portion DA may include a plurality of gate lines 700, a plurality of data lines 800 and electrical elements such as a plurality of thin film transistors.

The FPC pad portion 300 is a portion to which a flexible printed circuit board is attached in a later module process, and includes a plurality of third pads 320.

The DIC pad portion 400 includes a plurality of first pads 420 and a plurality of second pads 440.

The first pads 420 and the second pads 440 of the DIC pad portion 400 are portions to which a data driving IC is attached in a later module process, and particularly, a COG type driving IC is employed and mounted directly onto the array substrate.

The first pads 420 are formed corresponding to input pins of the data driving IC, and connected to the third pads 320 through first link lines 350 to supply signals or voltages to the data driving IC.

The second pads 440 are formed corresponding to output pins of the data driving IC, and are electrically connected to the data lines 800 through second link lines 450 to supply signals or voltages to the display area DA.

The data driving IC functions to supply image data voltages to the display area (DA) according to a timing signal and image data signal from the outside, and in some cases, the data driving IC may generate a timing signal therein other than the timing signal from the outside and generate or supply a gate driving signal.

The shorting bar 200 includes a plurality of conductive lines 220 formed along boundary portions between the cell areas CA, a first conductive bar 240 formed in an area of the DIC pad portion 400, and a second conductive bar 260 connecting the first conductive bar 240 and the conductive line 220.

The conductive line 220 is electrically connected to the third pads 320 through a plurality of third link lines 250.

The first conductive bar 240 is formed between an area of the first pads 420 and an area of the second pads 440, and is electrically insulated from the first pads 420 and the second pads 440.

Even though the data driving IC is mounted in a later module process, the first conductive bar 240 does not contact the input pins and the output pins of the data driving IC and thus does not influence circuit operation.

The first conductive bar 240 may have a long rectangular shape along an arrangement direction of the first pads 420 and the second pads 440.

The second conductive bar 260 is bent from an end of the first conductive bar 240 and extends to a peripheral portion of the non-display area NDA and is connected to the conductive line 220.

As the second conductive bar 260 functions to electrically connect the first conductive bar 220 to the conductive line 220, the second conductive bar 260 may be bent from both ends of the first conductive bar 240 and extends to be connected to the conductive line 220, or may be bent from both one end of the first conductive bar 240 and extends to be connected to the conductive line 220.

The first conductive line 240 functions as a discharge path of static electricity that occurs at the DIC pad portion 440 where the data driving IC is mounted.

Particularly, in a rubbing process of a cell process, static electricity is prone to occur because of friction between pads and lines in an area of the DIC pad portion 440 and a rubbing cloth, and as such the static electricity is lead to the first conductive bar 240 rather than to a pad or line and is discharged to the outside through the second conductive bar 260 and the conductive line 220.

If the static electricity is lead to the display area DA through the second pad 440 and not through the first conductive bar 240, the thin film transistors in the display area DA may be damaged. Accordingly, in order for the static electricity to move through the first conductive bar 240, it is preferred that a resistance of current path through the first conductive bar 240 is less than a resistance of current path through the second pad 440.

To do this, it is preferred that the line width (i.e. the width of conductive bar 240 perpendicular to the direction of static electricity current flowing out of the conductive bar 240) of the first conductive bar 240 be greater than a width of the second pad 440. The first conductive bar 240 may have a relatively greater width than the first and second pads 420 and 440 so long as the first conductive bar 240 does not make electrical contact with the first and second pads 420 and 440.

Moreover, the first conductive bar 240 may be formed of a material having a resistance that is less than the first and second pads 420 and 440.

The mother substrate 100 including the plurality of array substrates each including the shorting bar 200 including the conductive line 220 and the first and second conductive bars 240 and 260 is coupled to a separate substrate including a plurality of color filter substrates with a liquid crystal between the mother substrate 100 and the separate substrate, in a later cell process.

That structure is cut into cell units to form unit panels, and regarding the array substrate, the array substrate is cut along a scribing line SC that is defined to electrically and structurally separate the conductive line 220 from the first and second conductive bars 240 and 260. The scribing line SC may be defined to traverse the second conductive bar 260 and the third link line 250.

Accordingly, the non-display area NDA of the array substrate finally cut includes only the first and second conductive bars 240 and 260 because the conductive line 220 is cut away.

The scribing line SC may be defined at both of an upper portion and a lower portion with respect to the conductive line 220, and in this case, an area including the conductive line 220 is finally removed from the array substrate after the cutting process.

In case that the scribing line SC is defined only at a lower portion with respect to the conductive line 220, the conductive line is not removed and remains at a lower end portion of an upper array substrate.

Accordingly, according to the definition of the scribing line SC, the array substrate is cut to have the conductive line 220 at the lower end portion thereof, or cut to have no conductive line 220.

Then, the flexible printed circuit board and the data driving circuit are attached to the unit panel and a module process of assembling them with a backlight unit is performed.

Figure 5:
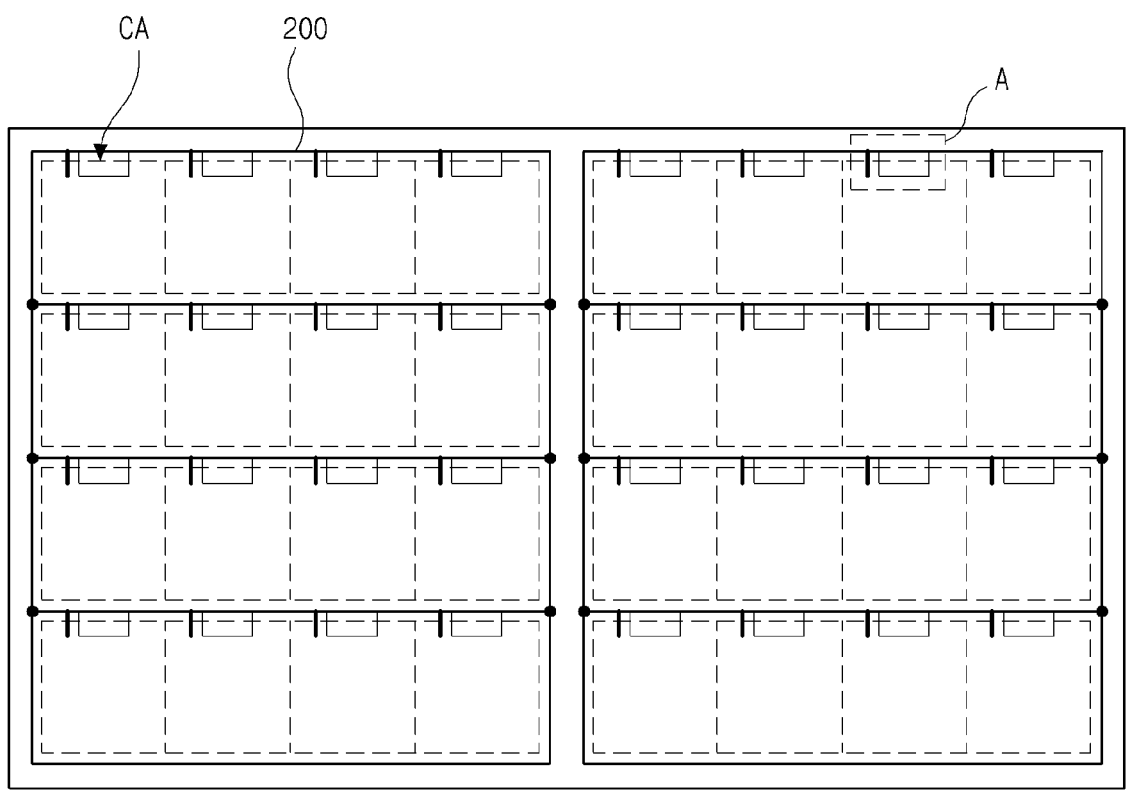
FIG. 5 is a view illustrating a mother glass including an array substrate for a display device according to another embodiment of the present invention.
Figure 6:
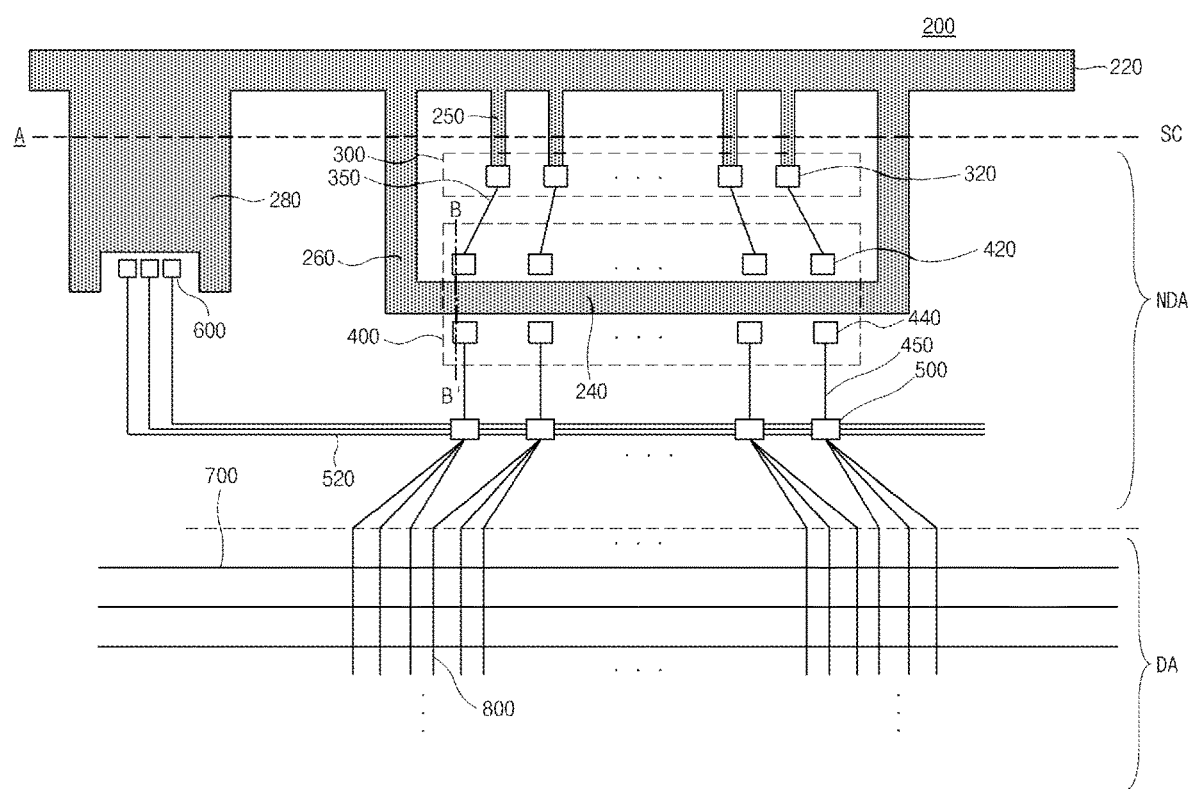
FIG. 6 is a view enlarging a region A of FIG. 5.

FIG. 5 is a view illustrating a mother glass including an array substrate for a display device according to another embodiment of the present invention, and FIG. 6 is a view enlarging a region A of FIG. 5.

The another embodiment includes the same as the FPC pad portion 300, the DIC pad portion 400, the conductive line 220 and the first and second conductive bars 240 and 260 of the first embodiment, and explanations of the components are omitted.

The array substrate may include on/off pads 600 for test in the non-display area NDA.

The on/off pads 600 may be used in a test process that checks defect of the panel before and after the cell process. Various external voltage signals are applied by a test apparatus or worker, and thus the defect of the panel may be checked.

For example, a clock signal is input to a gate driving circuit built in the array substrate through the on/off pad 600, and a test image voltage is input to each data line 800 through the on/off pad 600. Accordingly, even though operation is not performed with a real data driving IC mounted, whether the defect or no can be sensed in advance.

Moreover, in case that a plurality of demultiplexers 500 are formed on the array substrate, selective signals to control the demultiplexers 500 in the test process may be supplied through the on/off pads 600.

Each demultiplexer 500 makes 1:N connections of second pad 440 to data lines 800 and is connected to the second pad 440 through the second link line 450. Accordingly, each channel of the data driving IC can be connected to a plurality of data lines 800 and operation of time division can be performed for the data lines 800, and thus a number of channels of the data driving IC can be reduced.

The demultiplexer 500 includes at least two switch elements, and the switch elements are controlled by a select control signal and thus one out of N data lines 800 is selected.

The select control signal may be supplied through the FPC pad portion 300 from the outside, and in case that the data driving IC supplies a timing control signal to operate the display area DA, the select control signal may be supplied from the data driving IC.

The select control signal may be supplied through the on/off pads 600 from the outside in the test process, and supplied to the demultiplexers 500 through select control signal supply lines 520 connected to the on/off pads 600.

The shorting bar 200 includes the conductive line 220 and the first and second conductive bars 240 and 260, as shown in FIGS. 3 and 4, and further includes a third conductive bar 280.

The third conductive bar 280 is adjacent to the on/off pads 600 and prevents defects that static electricity occurring in a cell process or the like causes by flowing into the on/off pad 600 and damaging internal circuitry. Particularly, static electricity is prone to occur because of friction between an area of the on/off pad 600 and a rubbing cloth in a rubbing process of a cell process. The static electricity is lead to the third conductive bar 280 rather than the on/off pad 600 and is discharged to the outside through the conductive line 220.

The third conductive bar 280 may be formed to be in a rectangular shape and large such that it corresponds to an area where the on/off pads 600 are formed. In order to increase current inflow effect, the third conductive bar 280 may be formed to surround the on/off pads 600 such that it corresponds to a side surface of the on/off pads 600.

The mother substrate 100 including the plurality of array substrates each including the shorting bar 200 including the conductive line 220 and the first to third conductive bars 240, 260 and 280 is coupled to a separate substrate including a plurality of color filter substrates with a liquid crystal between the mother substrate 100 and the separate substrate, in a later cell process.

That structure is cut into cell units to form unit panels, and regarding the array substrate, the array substrate is cut along a scribing line SC that is defined to electrically and structurally separate the conductive line 220 from the first to third conductive bars 240, 260 and 280. The scribing line SC may be defined to traverse the second and third conductive bars 260 and 280 and the third link line 250.

Accordingly, the non-display area NDA of the array substrate finally cut includes only the first to third conductive bars 240, 260 and 280 because the conductive line 220 is cut away.

Then, the flexible printed circuit board and the data driving IC are attached to the unit panel and a module process of assembling them with a backlight unit is performed.

It is described above that the third conductive bar 280 is formed along with the first and second conductive bars 240 and 260, but it is not required. For example, in order to prevent static electricity flowing through the on/off pads 600, only the third conductive bar 280 is formed without the first and second bars 240 and 260.

Figure 7:
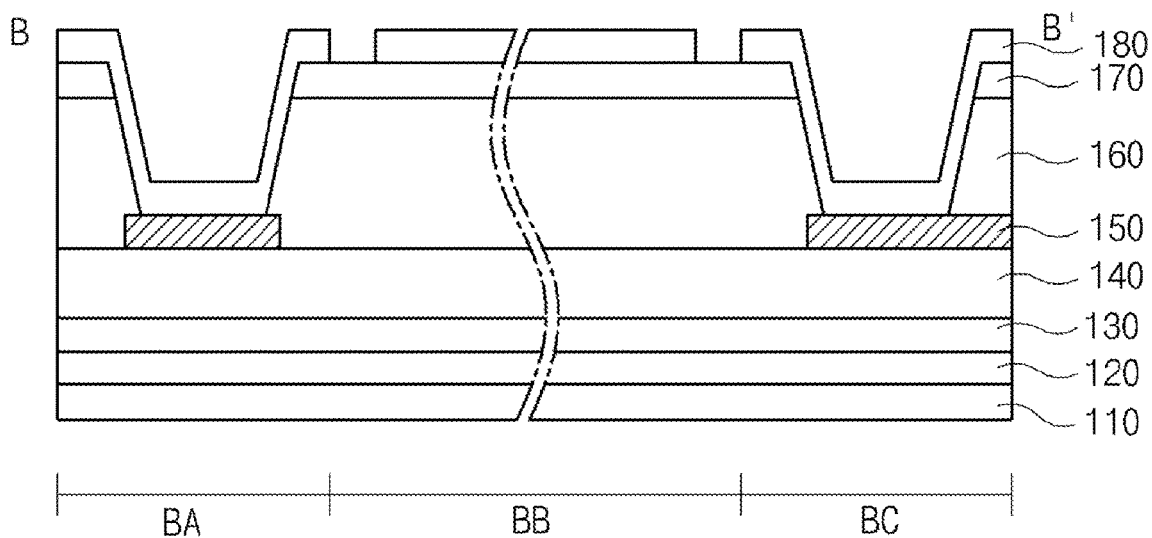
FIG. 7 is a cross-sectional view taken along a line B-B' of the DIC pad portion of FIG. 6.

FIG. 7 is a cross-sectional view taken along a line B-B' of the DIC pad portion of FIG. 6.

FIG. 7 shows a substrate where a semiconductor layer of a thin film transistor is formed of polysilicon, but it is not required. The semiconductor layer may be formed of amorphous silicon or oxide semiconductor. For the purpose of explanations, the array substrate where the semiconductor layer is formed of polysilicon is explained as below.

Referring to FIG. 7, a buffer layer 120 made of inorganic insulating material is formed on a transparent substrate 110 made of glass or etc.

The buffer layer 120 is configured to prevent property reduction of a thin film transistor that occurs because a semiconductor layer is influenced by alkali ions emitted from the substrate 110.

A gate insulating layer 130 is formed on the buffer layer 120. In the manufacturing processes, a semiconductor layer is formed between the process of forming the buffer layer 120 and the process of forming the gate insulating layer 130. However, since the semiconductor layer is etched and removed in area other than the display area DA in a mask process of forming the semiconductor layer, it is shown that the gate insulating layer 130 is formed on the buffer layer 120 without the semiconductor layer therebetween in the non-display area NDA.

The gate insulating layer 130 in the display area DA functions to insulate the semiconductor layer from a metal layer for a gate electrode and a gate line formed in a later process.

The metal layer for the gate electrode and the gate line may be etched and removed in area other than an area of thin film transistor of the display area DA in a mask process of forming the gate electrode and the gate line. Accordingly, in the area of B-B' of the DIC pad portion 400, an interlayer insulating film 140 is formed without the metal layer.

The metal layer for the gate electrode and the gate line may be formed by depositing at least one of molybdenum (Mo), titanium (Ti), tantalum (Ta), tungsten (W), copper (Cu), chrome (Cr), aluminum (Al), an alloy from combination thereof, indium tin oxide, and indium zinc oxide.

The interlayer insulating film 140 is formed on the gate insulating layer 130. The interlayer insulating film 140 in the display area DA functions to insulate the metal layer for the gate electrode and the gate line from a data line layer 150 formed in a later process.

The data line layer 150 in the display area DA may function as source/drain of the thin film transistor and a line supplying an image data voltage to the thin film transistor, and the data line layer 150 in the non-display area NDA may directly contact a transparent conductive layer 180, as shown in the cross-sectional view of the line B-B' of the DIC pad portion 400, and may function to be applied with the image data voltage supplied from a pad layer and supply the image data voltage to the inside of the panel.

The metal layer for the data line layer 150 may be formed by depositing at least of one molybdenum (Mo), titanium (Ti), tantalum (Ta), tungsten (W), copper (Cu), chrome (Cr), aluminum (Al), an alloy from combination thereof, indium tin oxide, and indium zinc oxide.

A first passivation layer 160 is formed on the data line layer 150. The first passivation layer 160 may be formed of an organic film, for example, polyimide, benzocyclobutene series resin, or acrylate.

Alternatively, the first passivation layer 160 may have a lamination structure of inorganic film and organic film, or a lamination structure of at least two organic films.

A second passivation layer 170 may be formed on the first passivation layer 160, and may be formed of an inorganic film using at least one of silicon oxide film, a silicon nitride film and a silicate film.

A transparent conductive layer 180 is formed on the second passivation layer 170. The transparent conductive layer 180 may be formed of at least one of indium tin oxide, indium zinc oxide and indium tin zinc oxide.

The transparent conductive layer 180 in the display area DA may function as a pixel electrode or common electrode, and the transparent conductive layer 180 in the non-display area NDA may function as a pad, which directly contacts the flexible printed circuit board or an input/output pin of the data driving IC, in order to be supplied from the outside.

To do this, the transparent conductive layer 180 contacts the data line layer 150 through a contact hole in the first and second passivation layers 160 and 170.

An area BA is a cross section for the first pad 420 of the DIC pad portion 400. The transparent conductive layer 180 of the first pad 420 contacts an input pin of the data driving IC, and functions to supply a timing signal and a data image signal supplied through the data line layer 150 to the data driving IC.

An area BC is a cross section for the second pad 440 of the DIC pad portion 400. The transparent conductive layer 180 of the second pad 440 contacts an output pin of the data driving IC, and functions to supply a timing signal or a data image voltage supplied from the data driving IC through the data line layer 150 to the display area DA.

An area BB is a cross section for the first conductive bar 240 of the shorting bar 200. The first conductive bar 240 includes the transparent conductive layer 180 and is separated and insulated from the transparent conductive layer 180 of the first and second pads 420 and 440 by a mask process.

Even though not shown entirely, the conductive line 220 and the second and third conductive bars 260 and 280 forming the shorting bar 200 other than the first conductive bar 240 have substantially the same cross section of the first conductive bar 240, and are connected to one another through the transparent conductive layer.

A line width of the first conductive bar 240 of the area BB is greater than line width of the first and second pads 420 and 440 of the areas BA and BC. Accordingly, in case that static electricity occurs, the static electricity moves to the first conductive bar 240 rather than the first and second pads 420 and 440, and thus damage on inter circuit due to the static electricity can be prevented.

In the present invention, an example using the liquid crystal display device is explained, but it is not required. A display device using the DIC pad portion 400 of the non-display area NDA can be used, for example, in an organic electroluminescent display device or the like.

As described above, the array substrate of the display device according to the embodiment of the present invention includes the first conductive bar formed between the input and output pads of the data driving IC and the second conductive bar extending from the end portion of the first conductive bar to the peripheral end portion. Accordingly, defects of the electrical elements of the array substrate due to static electricity that occur in a rubbing process and the like can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a display device comprising:
    a substrate including a display area for displaying an image, and a non-display area surrounding the display area;
    a first pad corresponding to an input pin of a data driving integrated circuit (IC) and formed at the non-display area;
    a second pad corresponding to an output pin of the data driving IC and formed at the non-display area;
    a first conductive bar formed between the first pad and the second pad;
    a second conductive bar extending from the first conductive bar towards an end of the substrate at an adjacent side edge of the substrate, the second conductive bar having an end that reaches the end of the substrate at the adjacent side edge of the substrate;
    an on/off pad formed at the non-display area for application of an on/off voltage from outside the array substrate; and
    a third conductive bar formed adjacent to the on/off pad, surrounding the on/off pad on three sides, and extending to a peripheral end portion of the non-display area, wherein the third conductive bar is physically separated from the first conductive bar, a width of the third conductive bar larger than a line width of the first conductive bar and a width of the second conductive bar.

2. The array substrate according to claim 1, wherein the first and second conductive bars are formed of a same material as the first and second pads.

3. The array substrate according to claim 1, wherein the first and second conductive bars each includes:
    a gate insulating layer on the substrate;
    a passivation layer on the gate insulating layer; and
    a transparent conductive layer on the passivation layer.

4. The array substrate according to claim 3, wherein the transparent conductive layer is comprised of indium tin oxide or indium zinc oxide.

5. The array substrate according to claim 1, wherein the third conductive bar has a rectangular shape corresponding to an area where the on/off pad is formed.

6. The array substrate according to claim 1, wherein the third conductive bar is formed to surround at least a part of an area where the on/off pad is formed.

7. The array substrate according to claim 1, wherein the display area includes: a gate line; a data line crossing the gate line to define a pixel region; and a thin film transistor connected to the gate line and the data line,
    wherein the array substrate includes a demultiplexer that is formed at the non-display area and between the second pad and the data line, and includes at least two switch elements to selectively supply an image data voltage from the data driving IC to the data line according to a select control signal, and
    wherein the select control signal is supplied to the demultiplexer through the on/off pad.

8. The array substrate according to claim 1, wherein the third conductive bar is formed of a same material as the second conductive bar.

9. The array substrate according to claim 1, wherein the second conductive bar extends from an end portion of the first conductive bar to a peripheral end portion of the non-display area.

10. The array substrate according to claim 1, wherein the second conductive bar extends in a perpendicular direction from the first conductive bar.

11. The array substrate according to claim 1, wherein the line width of the first conductive bar is greater than a width of the first pad.

12. The array substrate according to claim 1, wherein the line width of the first conductive bar is greater than a width of the second pad.

13. The array substrate according to claim 1, wherein the third conductive bar is formed adjacent to the on/off pad such that there is no intervening conductive bar between the third conductive bar and the on/off pad.

14. An array substrate for a display device comprising:
    a substrate including a display area for displaying an image, and a non-display area surrounding the display area;
    a first pad formed at the non-display area;
    a second pad formed at the non-display area;
    a first conductive bar formed between the first pad and the second pad;
    a second conductive bar extending from the first conductive bar towards an end of the substrate at an adjacent side edge of the substrate, the second conductive bar having an end that reaches the end of the substrate at the adjacent side edge of the substrate;
    an on/off pad formed at the non-display area for application of an on/off voltage from outside the array substrate; and
    a conductive bar formed adjacent to the on/off pad, surrounding the on/off pad on three sides, and extending towards an end of the substrate at an adjacent side edge of the substrate, the conductive bar having an end that reaches the end of the substrate at the adjacent side edge of the substrate, wherein the conductive bar is physically separated from the first conductive bar, a width of the conductive bar larger than a line width of the first conductive bar and a width of the second conductive bar.

15. The array substrate according to claim 14, wherein the display area includes: a gate line; a data line crossing the gate line to define a pixel region; and a thin film transistor connected to the gate line and the data line,
- wherein the array substrate includes a demultiplexer that is formed at the non-display area, and selectively supplies an image data voltage to the data line according to a select control signal, and
- wherein the select control signal is supplied to the demultiplexer through the on/off pad.

16. The array substrate according to claim 14, wherein the conductive bar has a rectangular shape corresponding to an area where the on/off pad is formed.

17. The array substrate according to claim 14, wherein the conductive bar is formed to surround at least a part of an area where the on/off pad is formed.

18. The array substrate according to claim 14, wherein one edge of the conductive bar is formed adjacent to one edge of the on/off pad, wherein the conductive bar extends from the one edge of the conductive bar to the adjacent side edge of the substrate.

19. The array substrate according to claim 14, wherein the conductive bar is formed adjacent to the on/off pad such that there is no intervening conductive bar between the conductive bar and the on/off pad.

* * * * *